Sept. 3, 1957 L. G. SIMJIAN 2,804,708
APPARATUS AND METHOD FOR RETOUCHING IMAGES
Filed April 6, 1955 2 Sheets-Sheet 1

INVENTOR.
LUTHER G. SIMJIAN
BY
Ervin B. Steinberg
AGENT.

Sept. 3, 1957  L. G. SIMJIAN  2,804,708
APPARATUS AND METHOD FOR RETOUCHING IMAGES
Filed April 6, 1955  2 Sheets-Sheet 2
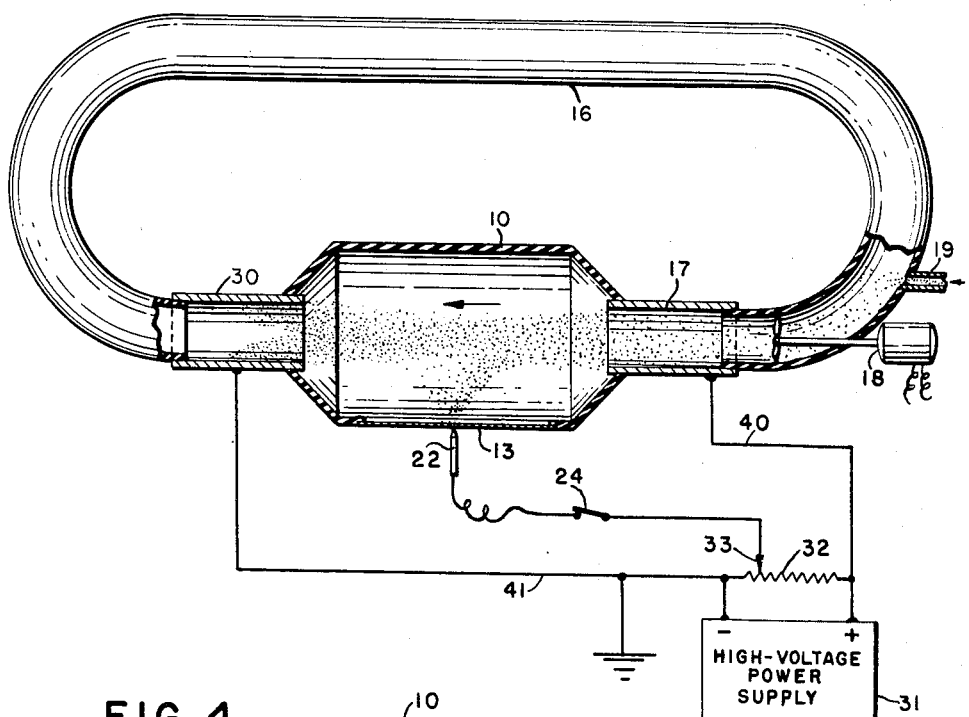
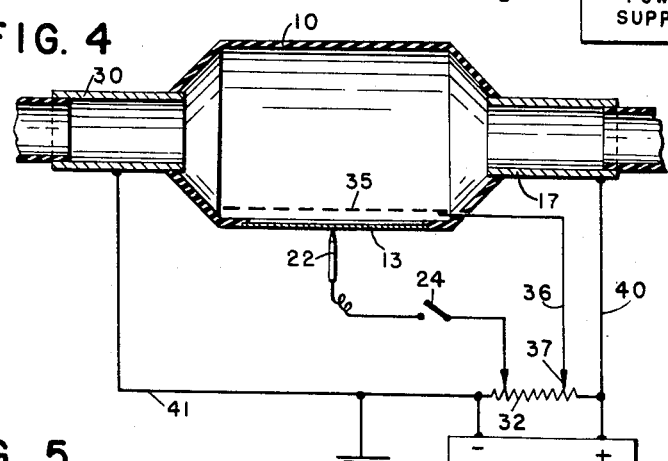
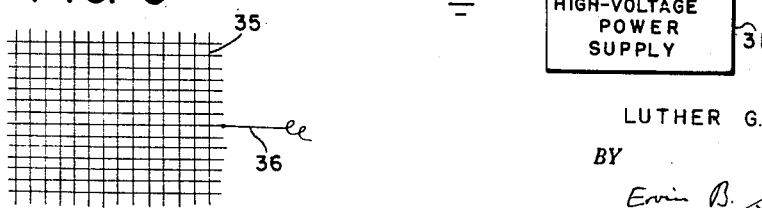
INVENTOR.
LUTHER G. SIMJIAN
BY
Ervin B. Steinberg
AGENT.

United States Patent Office 2,804,708
Patented Sept. 3, 1957

2,804,708
APPARATUS AND METHOD FOR RETOUCHING IMAGES

Luther G. Simjian, Greenwich, Conn.

Application April 6, 1955, Serial No. 499,730

9 Claims. (Cl. 41—1)

This application is a continuation-in-part of my co-pending application, Serial No. 337,091, filed February 16, 1953, now abandoned, for improvements in Apparatus and Method for Retouching Images, which application will now be permitted to lapse without prejudice in view of its being superseded by this present application.

This invention relates to an apparatus and method for retouching images and has particular reference to a method which employs electro-static deposition of color particles for retouching pictures, photographic images and the like.

The present method of retouching pictures, photographic images and similar articles employs coloring or emphasis of contrast by way of applying paint to the print which is to be retouched. The coloring paint is applied by using a brush, pen and/or a so-called "air brush." The handling of these instruments requires a certain skill and ability of the operator who often is required to take extensive training before he is ready for commercial work. Also the process is quite slow.

One of the objects of this invention is to provide an improved method for retouching images which avoids one or more of the disadvantages and limitations of prior art arrangements.

Another object of the invention is to provide an apparatus for retouching images which employs electro-static deposition of colored particles.

Another object of the invention is the provision of an apparatus in which the electro-static deposition can be accurately controlled and adjusted.

A still further object of the invention is the provision of an apparatus for retouching pictures which is simple to manipulate and requires little skill of the operator.

A still further object of the invention is to provide an apparatus in which a wide range of color contrast is achieved by simple control means.

The invention includes a set of complementary electrodes. Means for maintaining a high potential difference are connected between said electrodes and cause an electric field concentration. A picture to be retouched is mounted in close proximity to said electric field concentration and attenuated electrically charged color particles are supplied to said field near the picture.

For a better understanding of the present invention together with other and further objects thereof, reference is made to the following description taken in connection with the accompanying drawings in which:

Figure 3 is a variation of the design shown in Figures 1 and 2 employing a third electrode for more precise control of the retouching process;

Figure 4 is a further variation employing a baffle electrode for shielding the image; and Figure 5 shows a portion of the baffle electrode employed in Figure 4.

Figure 1:
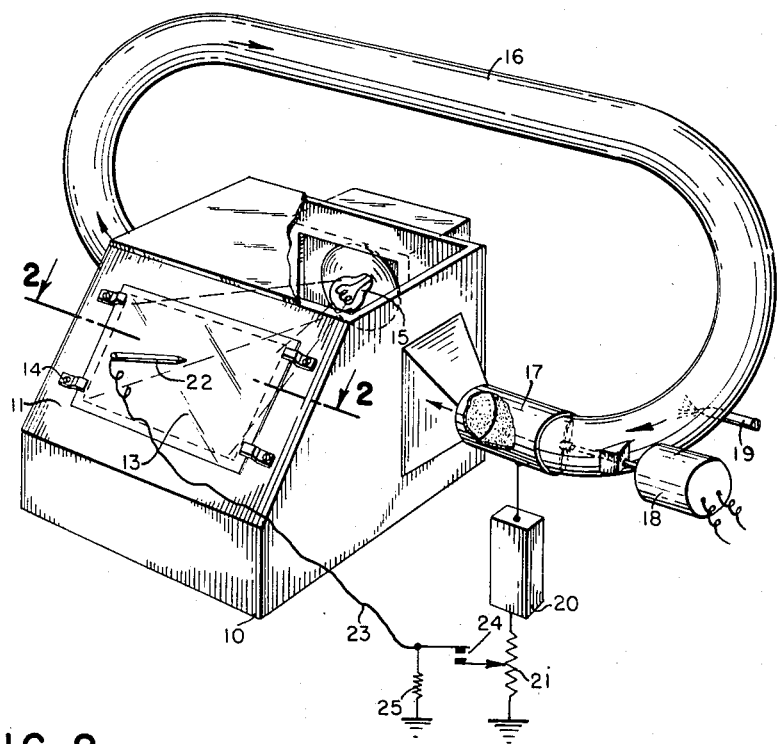
Figure 1 is a perspective and schematic view of the entire apparatus.
Figure 2:
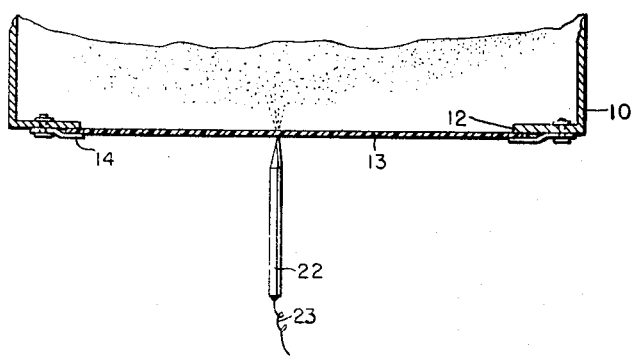
Figure 2 is a cross-sectional view taken at 2—2 of Figure 1 showing the mounting of the picture which is to be retouched.

Referring now to the figures, a mounting stand 10 in the general configuration of a box having an inclined front plate 11 is made preferably of electrically non-conductive material. The front plate 11 is equipped with an aperture 12 over which a picture 13 to be retouched is mounted. One side of the picture is exposed to the interior of the stand by virtue of the aperture. Several clamps 14 are employed to engage the marginal edges of the picture and to retain it over the aperture. A lamp 15 mounted near the top of the stand serves to illuminate that side of the picture which is exposed to the inside of the stand thereby rendering the picture well illuminated and defined for the retouching process.

A loop 16 made of electrically non-conductive piping or duct, except for a section 17 which is made of electrically conductive or metallic material, connects the opposing side plates of the stand 10.

A blower 18 connected to the loop causes air or some other medium suited for suspending attenuated color particles to circulate so as to supply a flow of color particles near that side of the picture which is exposed to the interior of the stand. The particles do not actually strike the picture surface except when caused to strike as explained below. It is understood that suitable baffle electrodes may be employed to shield the picture from stray particles. An injecting means 19 connected to the loop 16 serves to charge the loop with color particles.

One pole of a source of high voltage 20 is connected to the metallic section 17 of the duct and the other pole is connected via a current limiting resistor 21 to ground. A manually operable electrode 22 freely movable in three dimensions and shaped in the general configuration of a stylus is connected via a conductor 23 to a switch 24 and to the resistor 21 in such a manner as to vary the electrical potential established between the electrically-conductive duct section 17 and the stylus 22 which together constitute complementary electrodes. A discharge or bleeder resistor 25 is connected between the conductor 23 and ground. It will be obvious to those skilled in the art that the variable electrical potential may be obtained also by means of a voltage divider connected across supply 20 or by adjusting the potential on the low voltage, high current side of the high voltage supply. Likewise the circuit interrupting switch 24 may be arranged on the low voltage side of the supply rather than on the high potential side.

The operation of the apparatus may be visualized as follows: Picture 13 supported on stand 10 is retained by a plurality of clamps 14. Blower 18 is turned on so as to circulate the medium suspending the color particles which are injected into the loop by virtue of injecting means 19. Then, a high potential difference, in the order of several thousand volts, originating at supply 20 is applied between the electrically conductive portion 17 of the loop and the stylus-shaped manually operable electrode 22. If the color particles circulate in the direction of the arrows and if the electrode portion 17 of the loop is shaped such as to create a suitable amount of corona discharge at the exit side, the color particles become ionized and thereby electrically charged. When bringing the stylus in close proximity to or by touching selected portions of the picture 13 the ionized particles will deposit themselves on the picture opposite the stylus by virtue of the electrostatic field concentration.

By adjusting the potential difference the intensity of deposition can be regulated. When a finely divided spray over a comparatively large picture area is to be achieved, such as may be attained by conventional airbrushing, the stylus-shaped electrode may be held a suitable distance spaced from the picture in order to obtain a gradual distortion of the electro-static field at the plane of the picture 13. Still further, when a small picture area is to be intensified it is desirable that the stylus be brought in contact with the picture prior to the application of the high potential in which case the circuit interrupting means 24 are of considerable assistance. It is obvious therefore that a wide variety of shading, color graduation and contrast can be obtained by using this apparatus and a single stylus-shaped electrode. Where the picture is to be retouched with several colors, it is possible to inject a new color into the apparatus or to provide for a plurality of retouching apparatus, one for each color. Furthermore, it will be obvious to those skilled in the art that the stand 10 or loop 16 may be equipped with auxiliary electrodes in order to influence and to direct the flow of color particles, to collect excess color particles or also to collect color particles prior to changing the retouching color.

Such modifications are shown in Figures 3 and 4. In Figure 3 the flow of color particles is maintained between two stationary, spaced electrodes 17 and 30 which are connected to a high voltage power supply 31 by conductors 40 and 41 respectively. A voltage dividing resistor 32 is connected across the supply 31 permitting movable electrode 22 by virtue of slider 33 to be maintained at a potential adapted to attractingly divert color particles from the path between electrodes 17 and 30 and cause deposits on image 13 opposite to electrode 22, the image 13 now being positioned along the stationary field established by fixed electrodes 17 and 30. By means of slider 33 engaging resistor 32 the stylus shaped movable electrode may be adjusted for varying potentials to obtain accurate control of the intensity of the color deposit, especially when retouching delicate image details. The auxiliary electrode 30 serves to eliminate stray color particles within the stand 10 and in the loop 16, and further, if maintained at a suitable potential, directs the main flow of particles in such a manner as to be less "sensitive" to the influence of electrode 22 thereby permitting this retouching apparatus to be used by operators having a lower degree of manual dexterity.

In Figure 4 the image 13 which is to be retouched is shielded by a baffle electrode 35. This perforate electrode consisting of a wire mesh, illustrated in Figure 5, is connected to power supply 31 by means of conductor 36 and sliding contact 37 engaging voltage dividing resistor 32. Electrode 35 is maintained at a potential to normally repel the charged color particles. When closing contact 24, stylus 22 is energized however so as to attract color particles and to cause color deposits through the apertures of baffle electrode 35 onto the image 13. Both electrodes, the movable electrode 22 and baffle electrode 35, can be adjusted to suitable potentials by means of their respective sliders contacting resistor 32. It will be noted that the local electrostatic field concentration established by electrode 22 must be such as to overcome the electrostatic field generated by baffle electrode 35. In this arrangement the possibility of spattered color deposits upon image 13 is greatly diminished.

It is apparent that this apparatus and method provide a very simple and useful means readily adapted for retouching and coloring of pictures, photographs, photographic negatives, photographic transparencies and the like.

While there have been described and illustrated specific embodiments of the invention, it will be obvious that various changes and modifications may be made therein without departing from the field of the invention which should be limited only by the scope of the appended claims.

What is claimed is:

1. An apparatus for retouching images comprising stationary electrode means; means for energizing said electrode means with a high electrical potential to establish an electrostatic field; means for supplying to said field attenuated electrically charged color particles which are urged to move along said field, means for supporting an image along said field; a stylus shaped electrode freely movable in three dimensions maintained at a potential for varying said electrostatic field, and said electrode adapted to be moved relative to said image to cause selective deposition of color particles on said image.

2. An apparatus for retouching images comprising a set of stationary electrodes; means for maintaining a high potential difference between said electrodes to establish an electrostatic field therebetween; means for supplying to said field attenuated electrically charged color particles which are urged to flow between said electrodes; means for supporting a stationary image along said field; a stylus shaped electrode freely movable in three dimensions maintained at a potential intermediate that of said stationary electrodes; said electrode adapted to be moved relative to said image and when brought in proximity thereto causing a local field concentration to produce selective deposition of a portion of said particle flow upon said image.

3. An apparatus for retouching images comprising a set of stationary electrodes; means for maintaining a high potential difference between said electrodes to establish an electrostatic field therebetween; means for supplying to said field attenuated electrically charged color particles which are urged to flow between said electrodes; means for supporting one side of a stationary image along said field for communication with said flow of particles; a stylus shaped electrode freely movable in three dimensions maintained at a potential adapted to distort the field between said stationary electrodes; said electrode adapted to be moved relative to the other side of said image causing a local field concentration to produce selective particle deposition upon said image when brought in proximity thereto.

4. An apparatus for retouching images comprising a set of stationary electrodes; means for maintaining a high potential difference between said electrodes to establish an electrostatic field therebetween; means for supplying to said field attenuated electrically charged color particles which are urged to flow between said electrodes; a stationary stand disposed along said field for supporting an image to be retouched and exposing one image side to said flow of particles; a stylus shaped electrode maintained at a potential for distoring said electrostatic field; said electrode adapted to be moved freely in three dimensions relative to said stand and said stationary electrodes and causing color particle deposition on said image as the electrostatic field is altered by said movable electrode being moved toward said stand.

5. An apparatus for retouching images comprising; a loop for circulating attenuated color particles therein; a set of spaced stationary electrodes disposed within said loop; means for maintaining a high potential difference between said electrodes to establish an electrostatic field therebetween; means for supplying to said loop electrically charged attenuated color particles which by virtue of said potential are caused to flow along the space between said electrodes; said loop equipped with an aperture disposed intermediate said electrodes for receiving an image to be retouched and causing one side of said image disposed along said field to communicate with said particle flow; a stylus shaped electrode freely movable in three dimensions relative to said stationary electrodes disposed outside of said loop; means for maintaining said movable electrode at a potential for diverting a portion of said color particles from said flow between said stationary electrodes to cause a portion of said color particles to flow toward said aperture thus producing color deposition on selective portions of said image side which communicates with said flow of particles.

6. An apparatus for retouching images comprising; a loop for circulating attenuated color particles therein; a set of spaced stationary electrodes disposed within said loop; means for maintaining a high potential difference between said electrodes to establish an electrostatic field therebetween; means for supplying to said loop electrically charged attenuated color particles which by virtue of said potential are caused to flow along the space between said electrodes; said loop eqiupped with means adapted to fixedly retain along said field an image to be retouched and causing one side of said image to be capable of communication with said particle flow; a stylus shaped electrode freely movable in three dimensions relative to said stationary electrodes disposed outside of said loop; means for maintaining said movable electrode at a potential for diverting a portion of said color particles from said flow along the path between said stationary electrodes to cause a portion of said color particles to flow toward said image retaining means upon moving said movable electrode in proximity thereto, thus producing color deposition on selective portions of said image side which communicates with said flow of particles.

7. An apparatus as set forth in claim 6 wherein said aperture is shielded by a screen electrode which is maintained at a potential adapted to oppose the action of said movable electrode.

8. A method for retouching images comprising the steps of generating a stream of electrically charged color particles; positioning an image to be retouched along said stream; diverting a portion of said particle stream and directing it toward selected parts of said image to cause color particle deposition on said selected parts of the image.

9. A method for retouching images comprising the steps of establishing a stationary electrostatic field between a positive and a negative electrode; supplying attenuated color particles to said field thereby producing a flow of particles along said stationary field; positioning an image to be retouched along said field; distorting said stationary electric field to generate a local field concentration near said image to supply portions of said color particle flow to said image.

References Cited in the file of this patent

UNITED STATES PATENTS

| | | |
|---|---|---|
| 2,097,233 | Meston | Oct. 26, 1937 |
| 2,143,214 | Selenyi | Jan. 10, 1939 |
| 2,152,077 | Meston et al. | Mar. 28, 1939 |
| 2,476,145 | Gwyn et al. | July 12, 1949 |
| 2,495,146 | Straughn | Jan. 17, 1950 |